United States Patent
Wang et al.

(10) Patent No.: US 11,411,777 B2
(45) Date of Patent: Aug. 9, 2022

(54) PORT MAPPING FOR BONDED INTERFACES OF ECMP GROUP

(71) Applicant: VMware, Inc., Palo Alto, CA (US)

(72) Inventors: Dexiang Wang, San Jose, CA (US); Jia Yu, Sunnyvale, CA (US); Jayant Jain, Cupertino, CA (US); Mike Parsa, Santa Cruz, CA (US); Haihua Luo, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 201 days.

(21) Appl. No.: 16/742,633

(22) Filed: Jan. 14, 2020

(65) Prior Publication Data

US 2021/0218600 A1 Jul. 15, 2021

(51) Int. Cl.
*H04L 12/66* (2006.01)
*H04L 9/40* (2022.01)
*H04L 45/24* (2022.01)
*H04L 49/25* (2022.01)

(52) U.S. Cl.
CPC .............. *H04L 12/66* (2013.01); *H04L 45/24* (2013.01); *H04L 49/25* (2013.01); *H04L 63/0254* (2013.01)

(58) Field of Classification Search
CPC ..... H04L 12/66; H04L 63/0254; H04L 45/24; H04L 49/25; H04L 45/00
See application file for complete search history.

(56) References Cited

U.S. PATENT DOCUMENTS 9,258,282 B2 * 2/2016 Detienne ............ H04L 63/0428
10,333,849 B2 * 6/2019 Masurekar ............ H04L 47/125
10,873,473 B2 * 12/2020 Boutros ................ H04L 12/185
10,938,594 B1 3/2021 Jain et al.
11,038,791 B2 6/2021 Tantsura et al.
2015/0341428 A1 11/2015 Chauhan
(Continued)

FOREIGN PATENT DOCUMENTS

WO 2019042372 A1 3/2019
WO 2021145939 A1 7/2021

OTHER PUBLICATIONS

Non-Published Commonly Owned U.S. Appl. No. 16/742,663, filed Jan. 14, 2020, 55 pages, VMware, Inc.
(Continued)

*Primary Examiner* — Lan-Huong Truong
(74) *Attorney, Agent, or Firm* — Adeli LLP

(57) ABSTRACT

Some embodiments of the invention provide novel methods for providing a stateful service at a network edge device (e.g., an NSX edge) that has a plurality of north-facing interfaces (e.g., interfaces to an external network) and a plurality of corresponding south-facing interfaces (e.g., interfaces to a logical network). A set of interfaces on each side of the network edge device for a set of equal cost paths, in some embodiments, are bonded together in the network edge device to correspond to a single interface on either side of a logical bridge including at least one logical switch providing a stateful service implemented by the network edge device. The bond is implemented, in some embodiments, by a bonding module executing on the network edge device that maintains a mapping between ingress and egress interfaces to allow deterministic forwarding through the network edge device in the presence of bonded interfaces.

20 Claims, 13 Drawing Sheets

(56) References Cited

U.S. PATENT DOCUMENTS

| | | |
|---|---|---|
| 2016/0105471 A1 | 4/2016 | Nunes et al. |
| 2016/0294728 A1 | 10/2016 | Jain et al. |
| 2017/0034053 A1* | 2/2017 | Chanda ................. H04L 45/586 |
| 2017/0126812 A1 | 5/2017 | Singhal |
| 2018/0063160 A1 | 3/2018 | Kumar |
| 2019/0020490 A1 | 1/2019 | Boutros et al. |
| 2019/0260610 A1* | 8/2019 | Dubey ................... H04L 12/66 |
| 2020/0389388 A1 | 12/2020 | Liu et al. |
| 2021/0218623 A1 | 7/2021 | Jain et al. |

OTHER PUBLICATIONS

Non-Published Commonly Owned U.S. Appl. No. 16/742,685, filed Jan. 14, 2020, 54 pages, VMware, Inc.

\* cited by examiner

| Ingress Interface | Egress Interface |
|---|---|
| fp-eth0 | fp-eth2 |
| fp-eth1 | fp-eth3 |
| fp-eth2 | fp-eth0 |
| fp-eth3 | fp-eth1 |

721

720

720A

| Ingress Interface | Egress Interface |
|---|---|
| fp-eth0 | fp-eth2 |
| fp-eth1 | fp-eth3 |

721

720B

| Ingress Interface | Egress Interface |
|---|---|
| fp-eth2 | fp-eth0 |
| fp-eth3 | fp-eth1 |

721

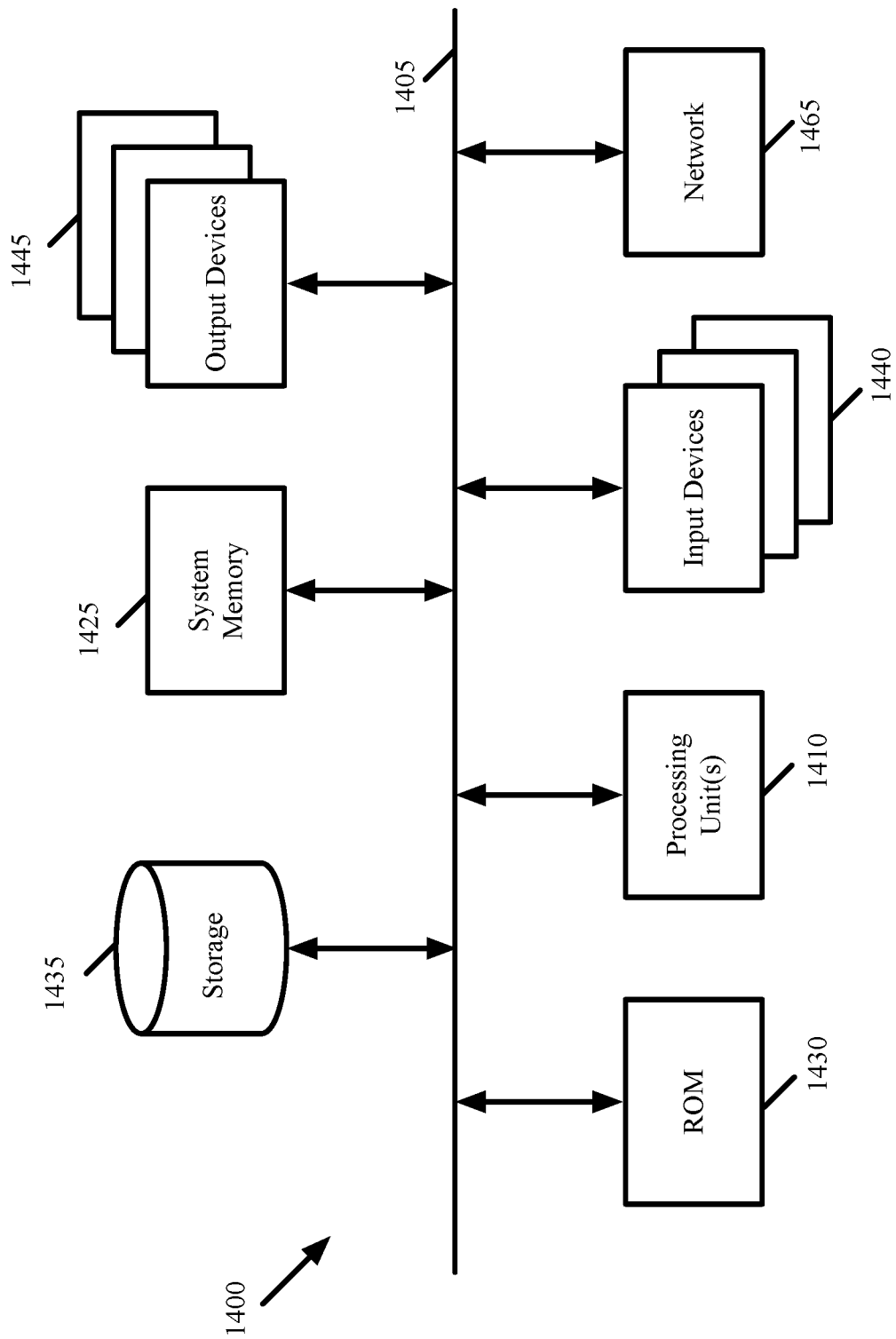

PORT MAPPING FOR BONDED INTERFACES OF ECMP GROUP

BACKGROUND

Providing a stateful service across two or more equal cost multipathing (ECMP) paths presents certain challenges. If different paths are selected for forward and return data messages of a data message flow, a service engine providing the stateful service on one path may not be able to track a state of the data message flow as the service engine will not receive all the data messages of the data message flow (i.e., will not receive data messages for which an alternative path is selected). If the different paths are combined to pass through a same service engine, the path selection is not respected as the combined paths will redistribute incoming data messages among the combined outgoing interfaces such that a particular data message will be forwarded along a different path than the path selected by the ECMP operation. Accordingly, a solution that respects ECMP path selection and maintains correct state information at a stateful service engine is required.

BRIEF SUMMARY

Some embodiments of the invention provide novel methods for providing a stateful service at a network edge device (e.g., an NSX edge) that has a plurality of north-facing interfaces (e.g., interfaces to an external network) and a plurality of corresponding south-facing interfaces (e.g., interfaces to an internal logical network). North-facing interfaces of the network edge device are associated with south-facing interfaces. In some embodiments, the association is one-to-one, while in other embodiments some interfaces are grouped (e.g., aggregated) and the groups are associated in a one-to-one fashion. The network edge device receives data messages at the interfaces from forwarding elements that select particular paths (e.g., interfaces of forwarding elements on the other side of the network edge device) for the data messages. The selection of paths, in some embodiments, is based on equal cost multipathing (ECMP) or a similar selection mechanism. The network edge device is transparent to the north and south forwarding elements such that they are not aware that the network edge device is interposed between north and south forwarding elements in some embodiments.

A set of interfaces on the north (south) side of the network edge device for a set of equal cost paths (e.g., an ECMP group), in some embodiments, are bonded together in the network edge device to correspond to a single interface on the north (south) side of a logical bridge including at least one logical switch providing a stateful service implemented by the network edge device. The bond is implemented, in some embodiments, using a bonding module executing on the network edge device that maintains a mapping between ingress and egress interfaces (in addition to standard bonding techniques) to allow deterministic forwarding through the network edge device in the presence of bonded interfaces. A bonding module on the ingress side for a particular data message, in some embodiments, associates an identifier of an ingress interface on which a data message is received with the data message. In some embodiments, the association is stored in metadata of the data message and is removed after a bonding module on the egress side determines the egress interface based on the mapping between ingress and egress interfaces.

In some embodiments, the at least one logical switch calls a service engine to provide the stateful service. The bonded interfaces force all traffic for the ECMP group to go through the same set of logical switches and call the same service engine to provide the stateful service and maintain state information for each flow crossing the logical switches. If the interfaces were not bonded and separate logical switches (and service engines) processed data messages on the separate paths, a return data message could use a different path than an original message and state information would not be kept by the service engine and the stateful service would not function properly.

The network edge device, in some embodiments, receives a data message at a first interface and provides the data message to the logical switch interface associated with the bonding module. The bonding module associates the data message with an identifier of the ingress interface. In some embodiments, the association is inserted in the data message, while in other embodiments the identifier is appended to the data message. A service engine is called by a logical switch, in some embodiments, to provide a stateful service. The service engine provides the stateful service and provides the data message to an egress interface associated with a second bonding module. The second bonding module uses a mapping table, in some embodiments, to determine an egress interface associated with the ingress interface. In some embodiments, the logical processing removes the ingress interface identifier and provides the data message to the egress module.

The network edge device, in some embodiments, is a primary network edge device and a secondary network edge device is implemented as a standby network edge device. The secondary network edge device replicates the interfaces and associations of the primary network edge device and is available to assume the functions of the primary network edge device in the case of a failure of the primary network edge device. In some embodiments, failure of the primary network edge device is defined by a user. The definition of failure, in some embodiments, is defined by a user-supplied policy (e.g., a threshold for a given metric). In other embodiments, failover occurs when all paths through the primary network edge device fail.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

FIG. 7 illustrates two sets of mapping tables that are used in different embodiments of the invention.

FIG. 14 conceptually illustrates a computer system with which some embodiments of the invention are implemented.

DETAILED DESCRIPTION

Figure 1:
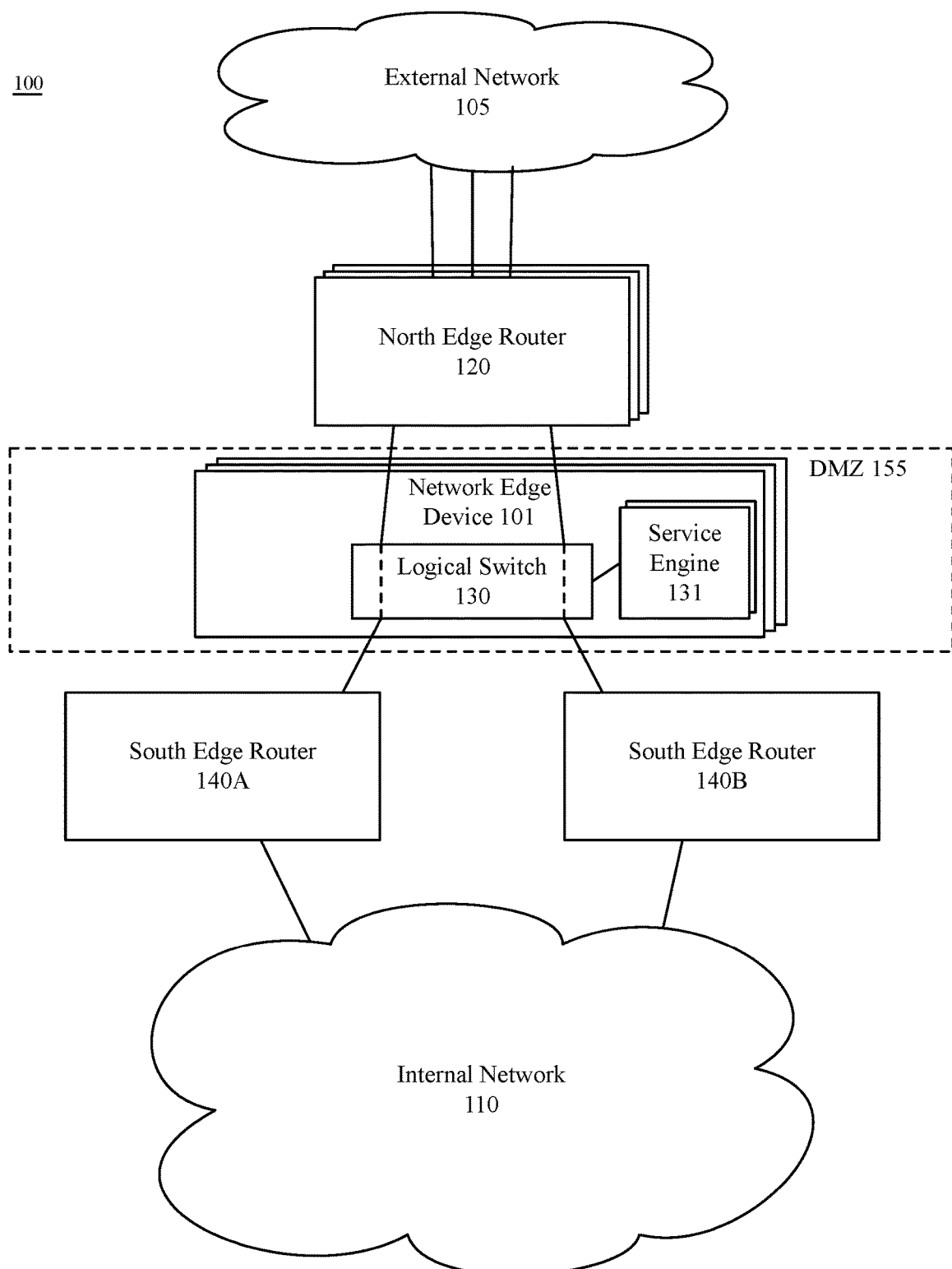
FIG. 1 illustrates an exemplary network topology of a system implementing an embodiment of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

As used in this document, the term data packet, packet, data message, or message refers to a collection of bits in a particular format sent across a network. It should be understood that the term data packet, packet, data message, or message may be used herein to refer to various formatted collections of bits that may be sent across a network, such as Ethernet frames, IP packets, TCP segments, UDP datagrams, etc. While the examples below refer to data packets, packets, data messages, or messages, it should be understood that the invention should not be limited to any specific format or type of data message. Also, as used in this document, references to L2, L3, L4, and L7 layers (or layer 2, layer 3, layer 4, layer 7) are references to the second data link layer, the third network layer, the fourth transport layer, and the seventh application layer of the OSI (Open System Interconnection) layer model, respectively.

Data messages, in some embodiments, are organized into data message flows based on being part of a same communication session between a source and destination compute node. A unidirectional data message flow is often defined by a set of header values (e.g., a 5-tuple for a TCP flow, or, more generally, an n-tuple) of a data message. A bidirectional data message flow includes both the forward unidirectional data message flow and the return unidirectional data message flow (e.g., a return flow that has a set of source and destination addresses reversed in relation to the forward flow). For the purposes of this discussion, a data message flow will refer to the bidirectional data message flow unless otherwise indicated.

A user-defined logical network as used in this application, refers to a particular logical abstraction of a network. In some embodiments, the logical abstraction includes logical counterparts to network elements of a physical network such as forwarding elements (e.g., switches, hubs, routers, bridges, etc.), load balancers, and firewalls. The logical forwarding elements (e.g., a logical switch or logical router) in some embodiments are implemented by a set of MFEs (e.g., physical or virtual/software switches, or routers) executing on host machines. A particular host machine may host data compute nodes (DCNs) (e.g., containers or virtual machines (VMs)) connected to multiple different logical networks and the set of MFEs implements all the logical networks to which the DCNs logically connect. Additional details of the structure and function of logical networks are described in U.S. Patent Publication 2016/0226754, which is hereby incorporated by reference.

A network edge device is implemented in some logical networks. A network edge device connects a first set of forwarding elements on a first side of the network edge device to a second set of forwarding elements on a second side of the network edge device. In some embodiments, the network edge device executes in a 'bare-metal' environment (i.e., directly on a physical device). The first set of forwarding elements, in some embodiments, are MFEs implementing a distributed logical router in a particular logical network and the second set of forwarding elements is a service router in the logical network that provides connectivity to an external network. In other embodiments, the first set of forwarding elements is a set of logical forwarding elements (e.g., routers, switches, etc.) in a logical network and the second set of forwarding elements is a set of forwarding elements external to the logical network.

In other embodiments, the network edge device operates between two networks (e.g., two logical networks, two physical networks, or between one logical network and one physical network). In some embodiments, the two gateway devices (e.g., network edge routers) associated with the two networks are equivalent to a single logical gateway that is separated into two logical gateways (e.g., one associated with each network) for additional security. The network edge device implements a set of logical switches in some embodiments. Logical switches, in some embodiments, are distributed logical switches implemented by a plurality of network edge devices. The logical switches are associated with a distributed stateful service, or set of stateful services, in some embodiments.

Some embodiments of the invention provide novel methods for providing a stateful service at a network edge device (e.g., an NSX edge) that has a plurality of north-facing interfaces (e.g., interfaces to an external network) and a plurality of corresponding south-facing interfaces (e.g., interfaces to a logical network). North-facing interfaces of the network edge device are associated with south-facing interfaces. In some embodiments, the association is one-to-one, while in other embodiments some interfaces are grouped (e.g., aggregated) and the groups are associated in a one-to-one fashion. The network edge device receives data messages at the interfaces from forwarding elements that select particular paths (e.g., interfaces of forwarding elements on the other side of the network edge device) for the data messages. The selection of paths, in some embodiments, is based on equal cost multipathing (ECMP) or a similar selection mechanism. The network edge device is transparent to the north and south forwarding elements such that they are not aware that the network edge device is interposed between north and south forwarding elements in some embodiments. For example, a time to live parameter is not decremented, and, conjunctively or alternatively, a source IP address is not changed.

FIG. 1 illustrates an exemplary network topology of a system 100 implementing an embodiment of the invention. System 100 includes a set of network forwarding elements connecting external network 105 and internal network 110. External network 105 and internal network 110 connect to a set of edge routers, i.e., north edge routers 120 and south edge routers 140 respectively, that connect the networks 105 and 110. The edge routers 120 and 140, in some embodiments, are any combination of physical routers and software routers implemented on a physical network edge device. The software routers, in some embodiments, are implemented as a plurality of forwarding elements such as a distributed router, a transit logical switch, and a service router as described in U.S. Patent Publication 2016/0226754. In some embodiments, the edge routers 120 and 140 are specifically the service routers of an edge device. The south edge routers 140, in some embodiments, are active-active edge devices for a same logical network (or set of logical networks) in internal network 110. In some other embodiments, the south edge routers 140 are in an active-standby configuration.

Interposed between north edge routers 120 and south edge routers 140 is a set of network edge devices 101 that each execute a set of logical switches 130 and a set of service engines 131 that provide a set of gateway services in a transparent bridge between interfaces of the north and south edge routers. A network edge device 101, in some embodiments, is a bare metal edge device. The provision of gateway services will be described in further detail below in relation to FIGS. 5-12. The set of network edge devices 101 implements a demilitarized zone (DMZ) 155 that provides an extra layer of protection between the external and internal networks 105 and 110. In some embodiments, each network edge device provides a connection between a specific internal (e.g., logical network) and the external network.

Figure 2:
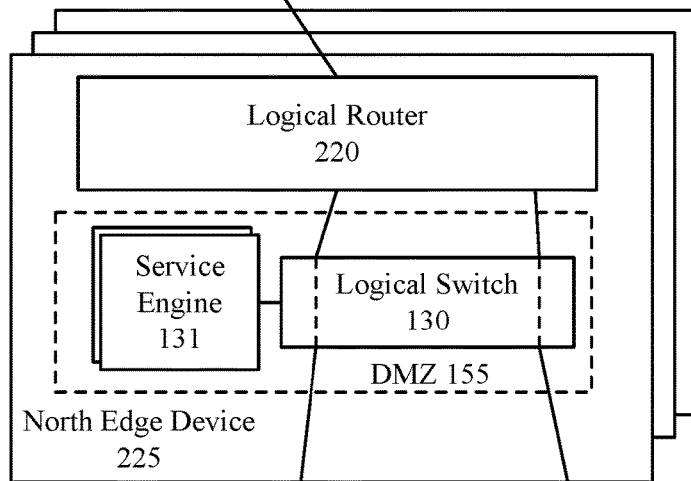
FIG. 2 illustrates a particular embodiment of a system topology that includes a north edge device implementing a logical router and a logical switch (and DMZ).

FIG. 2 illustrates a particular embodiment of a system topology that includes a set of north edge devices 225 each implementing logical router 220 (corresponding to a service router of north edge router 120) and the logical switch 130 (and DMZ 155). As opposed to FIG. 1, the external network is an external logical network 205. Additionally, the logical router 220, in some embodiments, is a component of external logical network 205. FIG. 2 illustrates a set of connections for a single north edge device 225 with a set of edge routers (e.g., in an active-active or active-standby configuration) of an internal network (e.g., a logical network) 110. However, in this and other embodiments, additional similar devices are employed in the system 200 for connecting to additional internal elements (e.g., edge routers of additional logical networks in the internal network 110).

Figure 3:
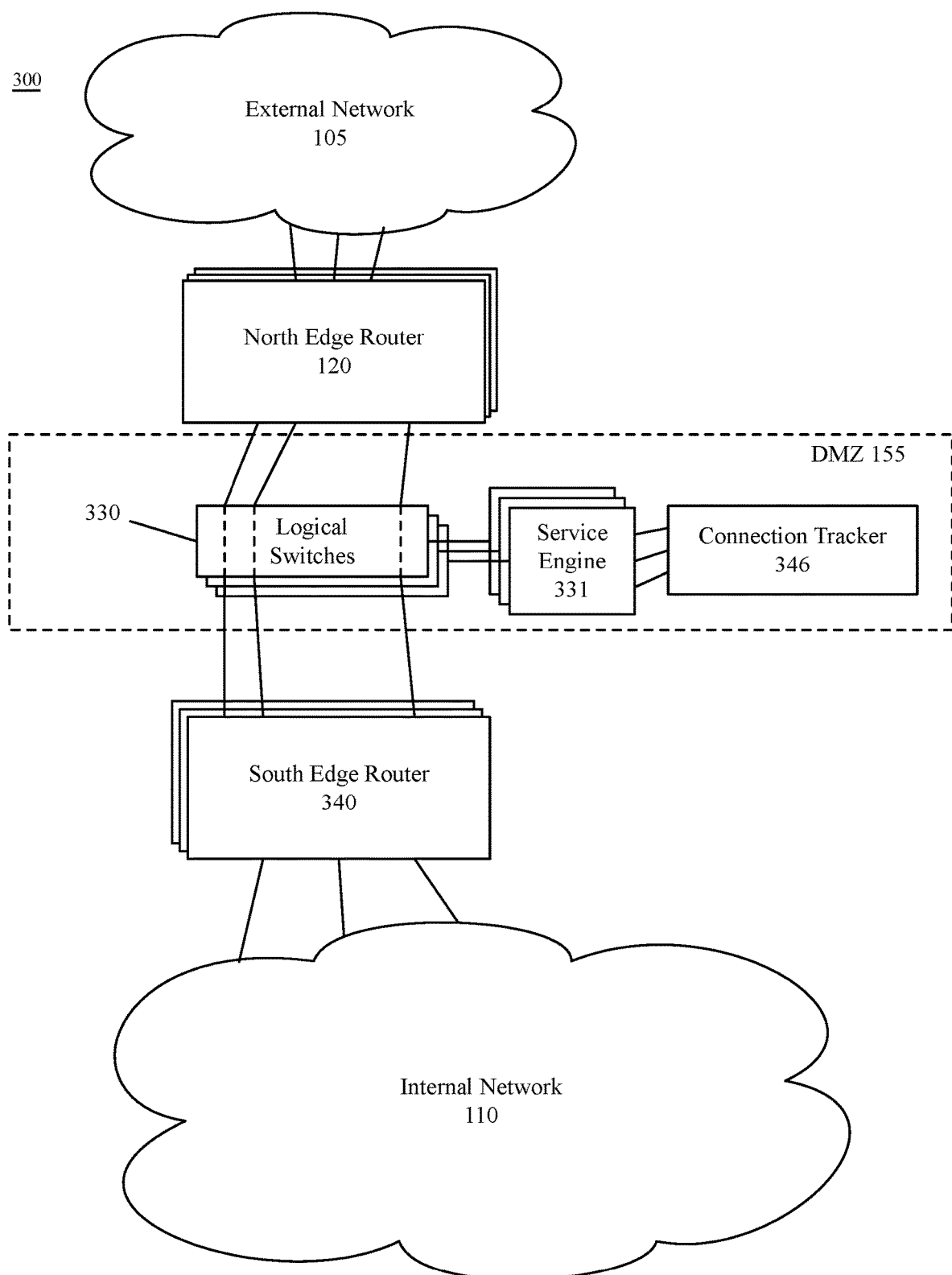
FIG. 3 illustrates a particular embodiment of a network topology of a system implementing an embodiment of the invention using a common connection tracker.

FIG. 3 illustrates a particular embodiment of a network topology of a system 300 implementing an embodiment of the invention using a common connection tracker. FIG. 3 includes a set of logical switches 330 in place of the single logical switch 130. One embodiment using a set of logical switches 330 is described in related U.S. patent application Ser. No. 16/742,663, filed Jan. 14, 2020, now published as U.S. Patent Publication 2021/0218623. The multiple logical switches 330, in some embodiments, are each implemented by a set of network edge devices making up the DMZ 155. Each logical switch in some embodiments includes an associated service engine 331 to provide a service for data messages traversing the DMZ 155. In other embodiments, each of a set of network edge devices implements a subset of logical switches (e.g., anywhere from one to all of the logical switches) in the set of logical switches 330. The service engines 331, in some embodiments, share a connection tracker 346 that maintains connection states for data flows passing through the DMZ using any of the logical switches 330.

FIG. 3 also includes a set of south edge routers 340 and a set of north edge routers 120. In some embodiments, each set of edge routers 120 and 340 represents a set of edge devices in one of an active-active or active-standby configuration. As discussed above, some embodiments implement the south edge router as a component of an edge device that also includes a transit logical switch and a distributed router for a logical network (e.g., a logical network in internal network 110). In some embodiments, a single physical device implements multiple south (north) edge routers in the set of south (north) edge routers 340 (120). In other embodiments, each edge router in the set of edge routers 120 and 340 are implemented by a different edge device. Some embodiments using an active-active configuration assign different traffic to different edge devices (e.g., using a sharding technique) to ensure that each data message in a particular data message flow (e.g., a bidirectional data message flow between a compute node in the internal network 110 and a compute node in the external network 105) is processed at a same edge device so as to maintain accurate state information without having to synchronize data-message-flow state information across edge devices.

Figure 4:
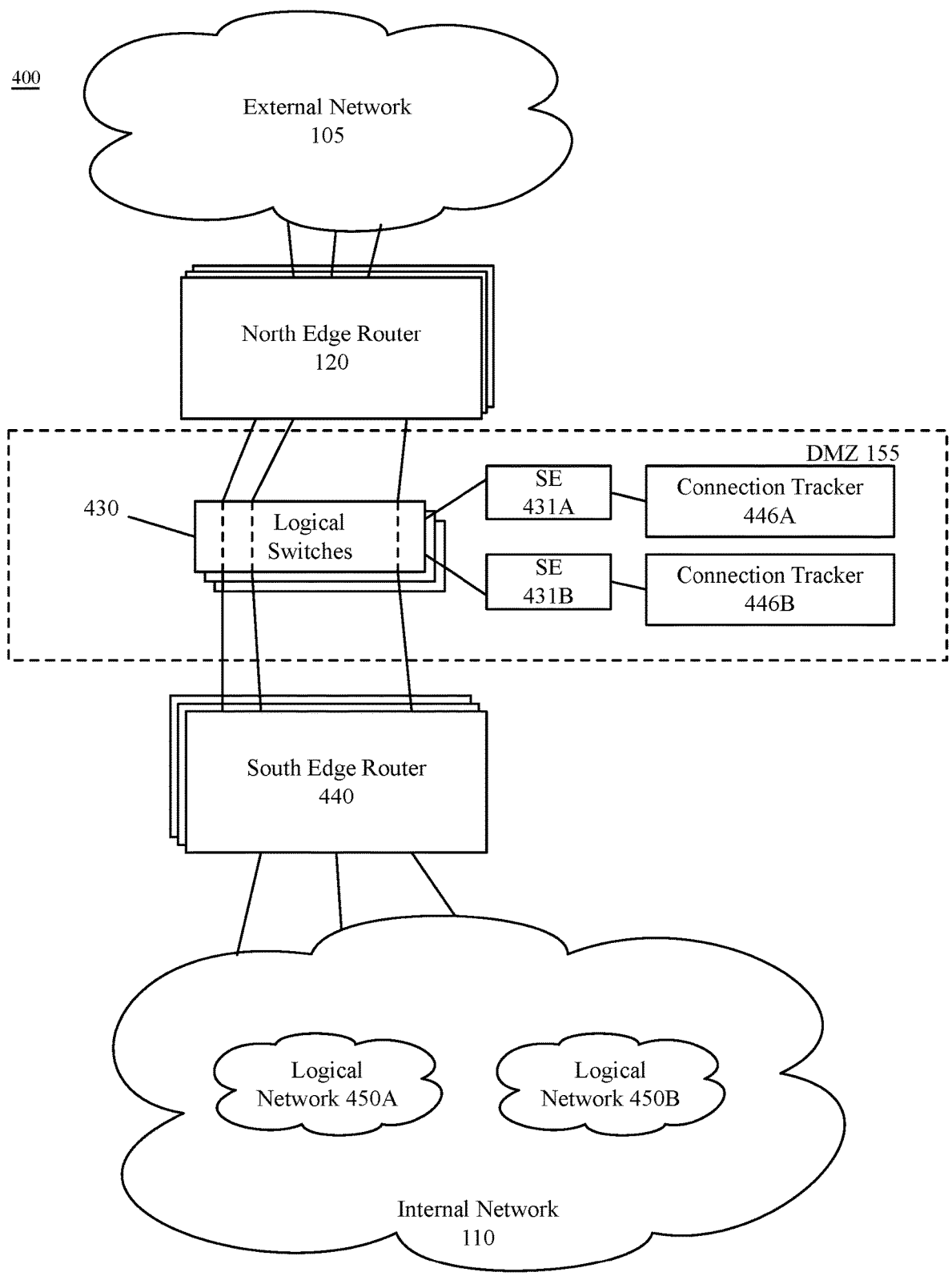
FIG. 4 illustrates a particular embodiment of a network topology of a system implementing an embodiment of the invention using different service engines for different logical networks.

FIG. 4 illustrates a particular embodiment of a network topology of a system 400 implementing an embodiment of the invention using different service engines for different logical networks. FIG. 4 includes a set of logical switches 430 as described in related U.S. patent application Ser. No. 16/742,663, filed Jan. 14, 2020, now published as U.S. Patent Publication 2021/0218623. The multiple logical switches 430, in some embodiments, are each implemented by a set of network edge devices making up the DMZ 155. Each network edge device, in some embodiments, also executes a set of service engines associated with different tenants or logical networks (e.g., logical networks 450A and 450B) for which it provides stateful services. Each logical switch, in some embodiments, can call any service engine 431 executing on the same network edge device to provide a service for data messages traversing the DMZ 155. The service engine called, in some embodiments, depends on the logical network associated with the data message to be provided the service. The service engines 431, in some embodiments, each have their own connection tracker 446 to maintain state data for data messages associated with the logical network 450 associated with the service engine 431 using the connection tracker 446. Further details of the implementation are discussed in related U.S. patent application Ser. No. 16/742,663, filed Jan. 14, 2020, now published as U.S. Patent Publication 2021/0218623.

FIG. 4 also includes a set of south edge routers 440 and a set of north edge routers 120. In some embodiments, each set of edge routers 120 and 440 represents a set of edge devices in one of an active-active or active-standby configuration. As discussed above, some embodiments implement the south edge router as a component of an edge device that also includes a transit logical switch and a distributed router for a logical network (e.g., a logical network in internal network 110). In some embodiments, the south edge routers 440 include south edge routers for both logical networks 450 that execute on a same edge device. In other embodiments, each logical network's south edge routers 440 execute on a different set of edge devices. In some embodiments, a single physical device implements multiple south (north) edge routers in the set of south (north) edge routers 440 (120). In other embodiments, each edge router in the set of edge routers 120 and 440 are implemented by a different edge device. Some embodiments using an active-active configuration assign different traffic to different edge devices (e.g., using a sharding technique) to ensure that each data message in a particular data message flow (e.g., a bidirectional data message flow between a compute node in the internal network 110 and a compute node in the external network 105) is processed at a same edge device so as to maintain accurate state information without having to synchronize data-message-flow state information across edge devices.

A set of interfaces on the north (south) side of the network edge device for a set of equal cost paths (e.g., an ECMP group), in some embodiments, are bonded together in the network edge device to correspond to a single interface on the north (south) side of a logical bridge including at least one logical switch providing a stateful service implemented by the network edge device. The bond is implemented, in some embodiments, using a bonding module executing on the network edge device that maintains a mapping between ingress and egress interfaces to allow deterministic forwarding through the network edge device in the presence of bonded interfaces (in addition to standard bonding techniques). A bonding module on the ingress side for a particular data message, in some embodiments, associates an identifier of an ingress interface on which a data message is received with the data message. In some embodiments, the association is stored in metadata of the data message and is removed after a bonding module on the egress side determines the egress interface based on the mapping between ingress and egress interfaces.

Figure 8:
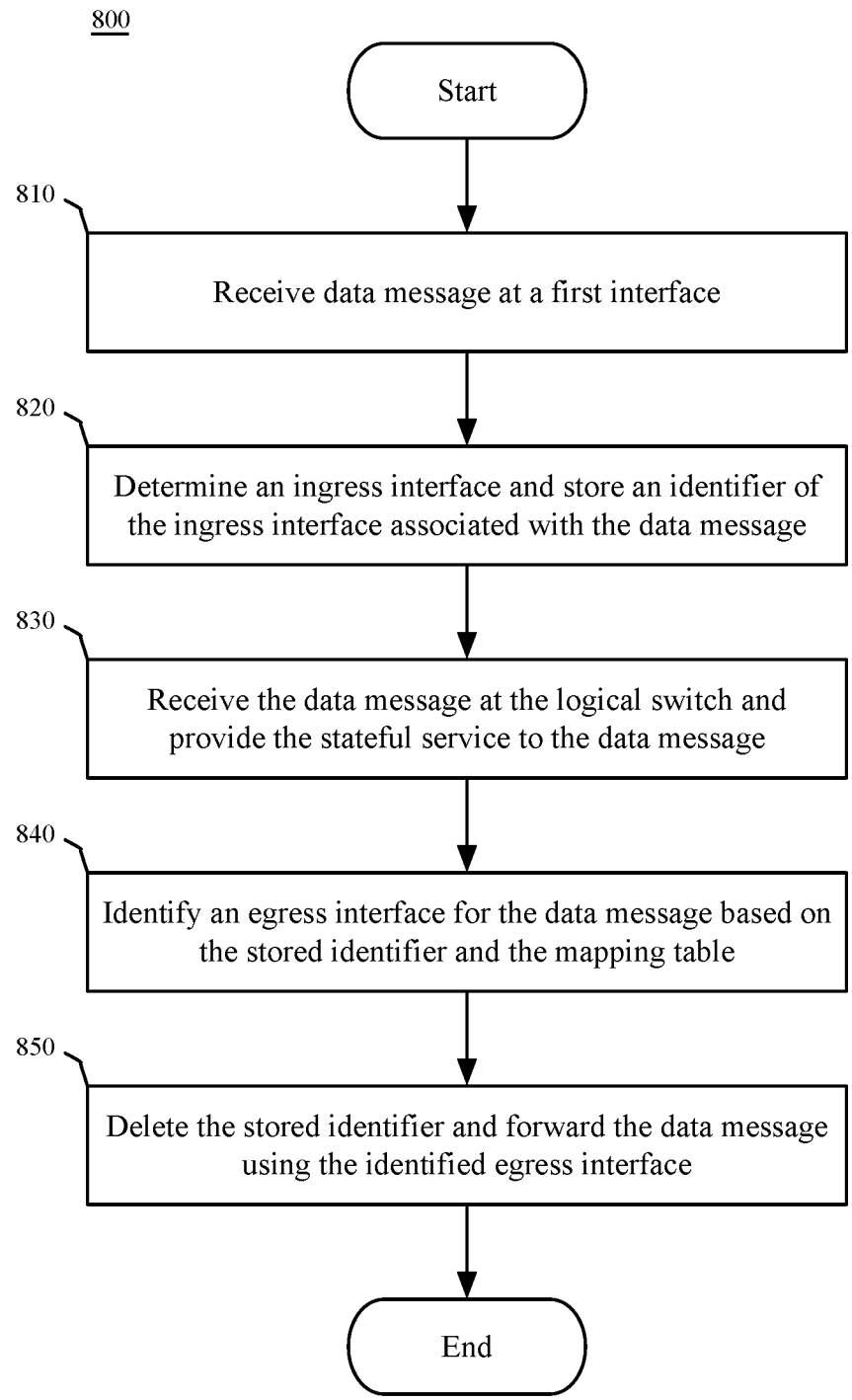
FIG. 8 conceptually illustrates a process for using the configured network edge device to provide a stateful service.

In some embodiments, the at least one logical switch calls a service engine to provide the stateful service. The bonded interfaces force all traffic for the ECMP group to go through the same set of logical switches and call the same service engine to provide the stateful service and maintain state information for each flow crossing the logical switches. If the interfaces were not bonded and separate logical switches (and service engines) processed data messages on the separate paths, a return data message could use a different path than an original message and state information would not be kept by the service engine and the stateful service would not function properly. FIGS. 8-7 illustrate aspects of configuring and using an exemplary embodiment using bonded interfaces depicted in FIG. 9.

Figure 5:
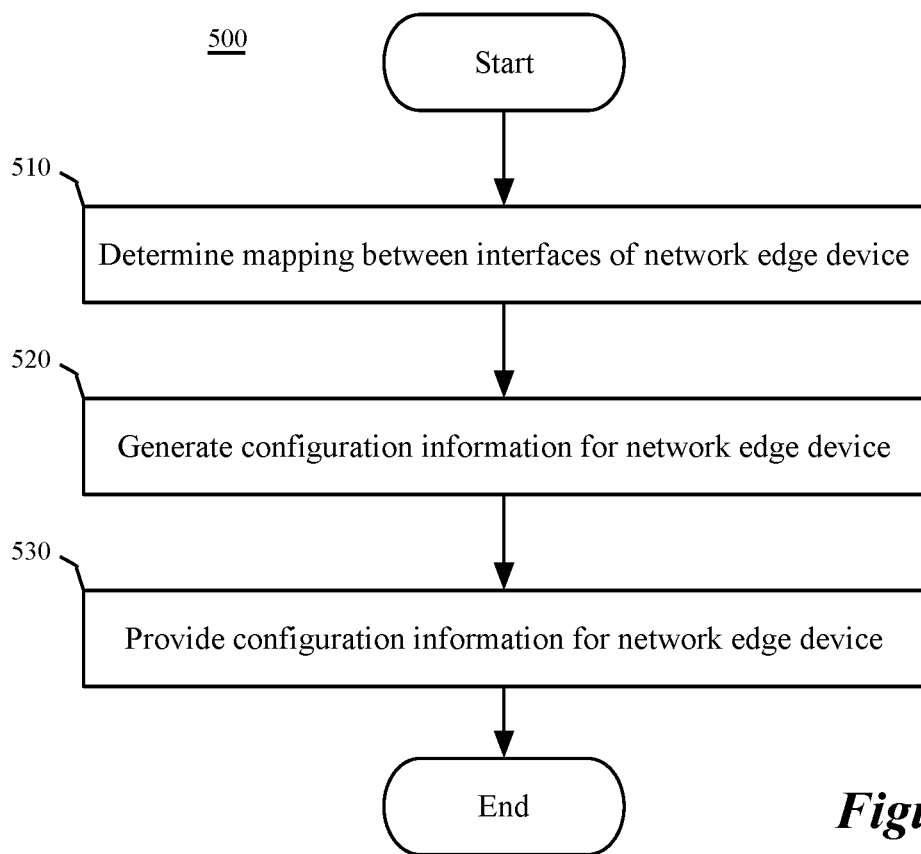
FIG. 5 conceptually illustrates a process for configuring a network edge device to process data messages using a set of bonded interfaces with deterministic mapping between bonded interfaces.

FIG. 5 conceptually illustrates a process 500 for configuring a network edge device to process data messages using a set of bonded interfaces with deterministic mapping between bonded interfaces. Process 500, in some embodiments, is performed by a network manager computer (e.g., a virtualization controller, a network manager, etc.). Process 500 begins (at 510) by determining a mapping between interfaces of the network edge device. In some embodiments, the network edge device is a transparent (e.g., bump-in-the-wire) device that provides a service without changing the data message in a way that is apparent to the forwarding elements. Accordingly, each source forwarding element expects that a data message sent from a first interface of the source forwarding element/network edge device will arrive at a second interface of the network edge device/destination forwarding element and not at a third interface of the network edge device/destination forwarding element. Because of this expectation, the normal function of a set of bonded interfaces (e.g., selecting an egress interface through a round robin, or other algorithm) would break the transparency of the network edge device (and, in some embodiments, would result in a forwarding failure) if a data message received at the first interface was received at the third interface.

After determining (at 510) the mapping of the interfaces, the process 500 generates (at 520) configuration information for bonding interfaces on the network edge device. In some embodiments, the configuration information includes an identification of sets of interfaces to bond into a single interface of a set of logical switches that bridge networks on either side of the network edge device. In some embodiments, the identified sets of interfaces include all the interfaces of the network edge device. In other embodiments, the sets of interfaces include all the interfaces that are not management interfaces. The configuration information, in some embodiments, includes configuration for a service engine that provides a stateful service (e.g., firewall, network address translation, virtual private network, etc.) associated with the set of logical switches.

The configuration information, in some embodiments, includes a set of mapping information (e.g., a mapping table or tables) to maintain deterministic forwarding between interfaces of the network edge device. In some embodiments, the set of mapping tables includes separate mapping tables for a north- and south-side bonding module. The generated configuration data is then provided (at 530) to the network edge device (or devices) to be used by the network edge device to configure the bonded interfaces and bonding modules executing on the network edge device and the process ends.

Figure 6:
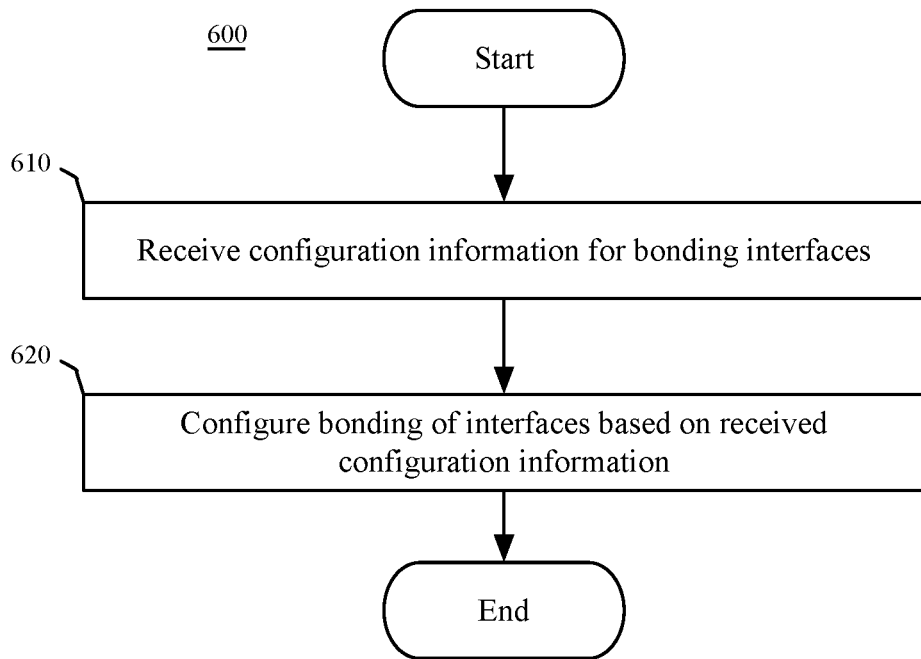
FIG. 6 conceptually illustrates a process for configuring a network edge device to implement the bonded interfaces and bonding modules that, in some embodiments, maintain the mapping tables generated.

FIG. 6 conceptually illustrates a process 600 for configuring a network edge device to implement the bonded interfaces and bonding modules that, in some embodiments, maintain the mapping tables generated (at 520). The process 600 begins (at 610) by receiving configuration information for configuring the bonded interfaces and bonding modules of the network edge device. The configuration data, in some embodiments, is received from a network manager computer. In some embodiments, the configuration information identifies interfaces that are to be bonded into a single interface of a logical switch. In some embodiments, the configuration information identifies a first set of interfaces that are bonded into an interface of a south-side logical switch and a second set of interfaces that are bonded into an interface of a north-side logical switch. The configuration information also includes, in some embodiments, a set of mapping tables that include mappings between individual interfaces of the network edge device.

After receiving (at 610) the configuration information, the process 600 configures (at 620) the network edge device to bond the identified interfaces into a single logical interface and maintain the mapping tables that, in some embodiments, are stored in a bonding module. Configuring the interface bonding, in some embodiments, includes configuring the set of logical switches that make up a bridge between the networks on either side of the network edge device (through the bonded interfaces). In some embodiments, a single logical switch is implemented with each bonded interface corresponding to a different interface of the implemented logical switch. In other embodiments, a pair of logical switches (i.e., a north-side logical switch and south side logical switch) is implemented with each set of bonded interfaces connecting to a corresponding logical switch. The logical switch configuration data, in some embodiments, includes configuration information for a service engine that provides a stateful service.

The network edge device, in some embodiments, also configures the bonding modules to store the received mapping table(s). In some embodiments, the network edge device stores a single mapping table that is accessible to each bonding module, while in other embodiments, each bonding module stores a separate mapping table. The mapping table, in some embodiments, is received as a single mapping table that is split into the two separate tables at the network edge device. Two exemplary sets of mapping tables are depicted in FIG. 7. One of ordinary skill in the art will appreciate that there are many ways to store the mapping tables that are excluded by the description of the specific examples.

FIG. 7 illustrates two sets of mapping tables 710 and 720 that are used in different embodiments of the invention. Mapping table 710 is a single mapping table that includes an association between every possible ingress interface of the network edge device and an egress interface of the network edge device. Each bonding module uses table 710 to identify an egress interface for a data message associated with a particular ingress interface.

Mapping table set 720 includes two different mapping tables (e.g., 720A and 720B) stored by different bonding modules. Mapping table 720A is for a first bonding module bonding interfaces fp-eth0 and fp-eth1 and mapping table 720B is for a second bonding module bonding interfaces fp-eth2 and fp-eth3. Each individual table 720A and 720B stored by a bonding module only stores entries 721 for interfaces that it is not bonding, as data messages received from the interfaces it bonds are provided to the logical switch and the other bonding module to determine an egress interface based on the ingress interface.

The network edge device, in some embodiments, receives a data message at a first interface and provides the data message to the logical switch interface associated with the bonding module. The bonding module associates the data message with an identifier of the ingress interface. In some embodiments, the association is inserted in the data message, while in other embodiments the identifier is appended to the data message. In yet other embodiments, the ingress interface is stored as metadata associated with the data message. A service engine is called by a logical switch, in some embodiments, to provide a stateful service. The service engine provides the stateful service and provides the data message to an egress interface associated with a second bonding module. The second bonding module uses a mapping table, in some embodiments, to determine an egress interface associated with the ingress interface. In some embodiments, the logical processing removes the ingress interface identifier and provides the data message to the egress module.

FIG. 8 conceptually illustrates a process 800 for using the configured network edge device to provide a stateful service. The process 800, is performed by the network edge device, but one of ordinary skill in the art will understand that different modules of the network edge device may be responsible for different operations of process 800. The process 800 begins (at 810) by receiving a data message at a first, ingress interface of the network edge device. The data message is received, in some embodiments, based on a selection of the interface from a plurality of possible interfaces (e.g., paths) by an upstream forwarding element (e.g., a router performing an ECMP operation).

After receiving (at 810) the data message at the first interface, the process 800, determines (at 820) an ingress interface associated with the data message and stores an identifier of the ingress interface for the data message. In some embodiments, the identified ingress interface is stored in metadata associated with the data message. The identifier, in some embodiments, is stored in the data packet itself (e.g., in an encapsulation header or other unused portion of the data message). One of ordinary skill in the art will appreciate that additional methods of storing the ingress interface identifier are possible. The data message associated with the identifier for the ingress interface is then provided to the logical switch interface associated with the bonded interfaces.

The logical switch (or service engine associated with the logical switch) provides (at 830) the stateful service to the data message. In some embodiments, the logical switch interface calls the service engine associated with the logical switch. The stateful service, in some embodiments, is at least one of a firewall, network address translation, and a VPN. If the stateful service is a firewall, providing the stateful service can lead to a data message being dropped. However, for the purposes of illustration, the description of FIG. 8 assumes that the data message is allowed. One of ordinary skill in the art will understand that if a data message is dropped the process 800 does not proceed to the next operation. Once the service engine has provided the stateful service the data message, in some embodiments, is returned to the logical switch interface from where it was called, while in other embodiments it is provided to an interface (e.g., the interface associated with the bonded interfaces) of the next logical switch on the egress side (for the particular data message) of the network edge device.

The bonding module then identifies (at 840) an egress interface for the data message based on the stored ingress interface identifier using the mapping table. The ingress interface identifier is associated with a particular egress interface in the mapping table. In some embodiments, different associations between interfaces can exist for different flows. In such embodiments, a separate mapping table is stored for each flow and is identified by a flow identifier such as a five tuple or a hash of header values of the data messages in the data message flow.

The bonding module then removes (at 850) the ingress interface identifier and provides the data message to the egress interface to forward to the next hop of the data message. The removal of the identifier, in some embodiments, is optional. For example, if the identifier is stored in an unused portion of a data message header, such that it will not affect the subsequent forwarding operations or the content of the data message, there is no need to remove the identifier and operation 850 will merely provide the data message to the identified egress interface. Once the data message is provided to the egress interface and forwarded to the next hop, the process ends.

Figure 9:
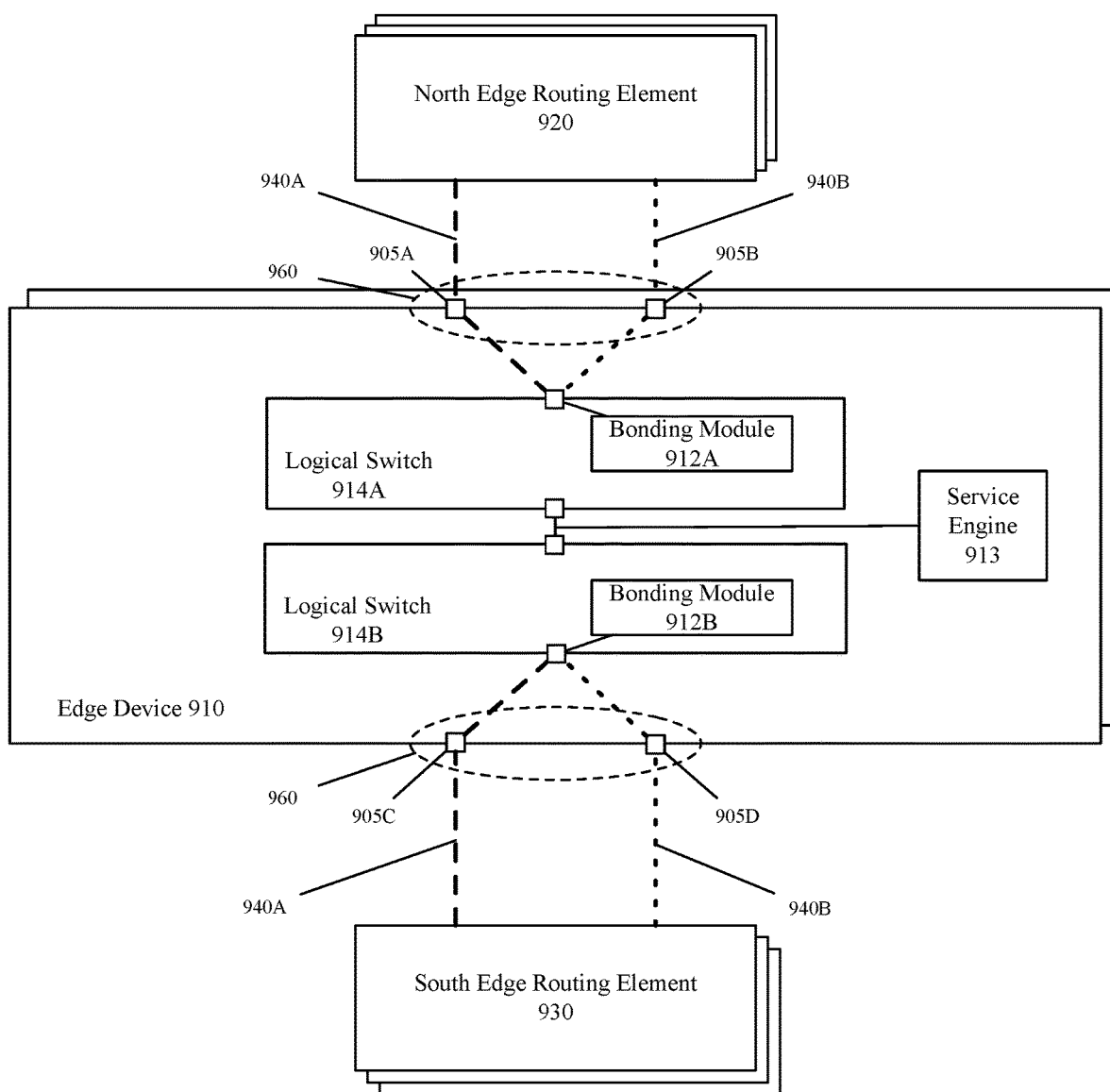
FIG. 9 illustrates a particular network edge device in a set of network edge devices connecting a first north edge routing element and a south edge routing element.

FIG. 9 illustrates a particular network edge device 910 in a set of network edge devices connecting a first north edge routing element 920 (in a set of north edge routing elements) connected to interfaces 905A (e.g., fp-eth0) and 905B (e.g., fp-eth1) and a south edge routing element 930 (in a set of south edge routing elements) connected to interfaces 905C (e.g., fp-eth2) and 905D (e.g., fp-eth3). The paths between routing elements 920 and 930 (i.e., 905A to 905C and 905B to 905D) are equal cost in the illustrated embodiment and either can be selected for transmitting data messages between the routing (e.g., forwarding) elements 920 and 930. The network edge device 910 includes bonded interfaces indicated by the dotted ellipse 960 and bonding modules 912A and 912B that support the bonded interfaces on the north and south sides of the network edge device 910, respectively. The bonding modules 912 are implemented, in some embodiments, as part of a set of logical switches 914 that (1) provide a bridge between the north and south networks and (2) provide a stateful service for data messages crossing the bridge. The bridge in FIG. 9 is depicted as two logical switches 914A and 914B, however, in some other embodiments, the bridge is implemented using a single logical switch with separate interfaces (e.g., ports) connecting to the north and south side bonded interfaces.

The logical switches 914 provide a stateful service to data messages passing through the set of logical switches 914 between the two networks. The stateful service, in some embodiments is provided by a service engine 913 that provides a firewall service, network address translation, virtual private network, etc. that may require processing all the data messages in a data message flow for proper performance. Additional services, in some embodiments, are provided by additional service engines (not shown for clarity). By bonding the two equal cost paths at the logical switch interface, the invention ensures that all data messages that are sent along either path are processed by the same service engine 913 to ensure that state information maintained at the service engine is complete. As path 940A connects interfaces 905A and 905C and path 940B connects interfaces 905B and 905D, the bonding modules store a mapping table that ensures that traffic received at any particular interface are forwarded to the destination using the corresponding interface. One of ordinary skill in the art would appreciate that in some embodiments there are many more than two equal cost paths and that two paths are shown for clarity in FIG. 9.

Figure 10:
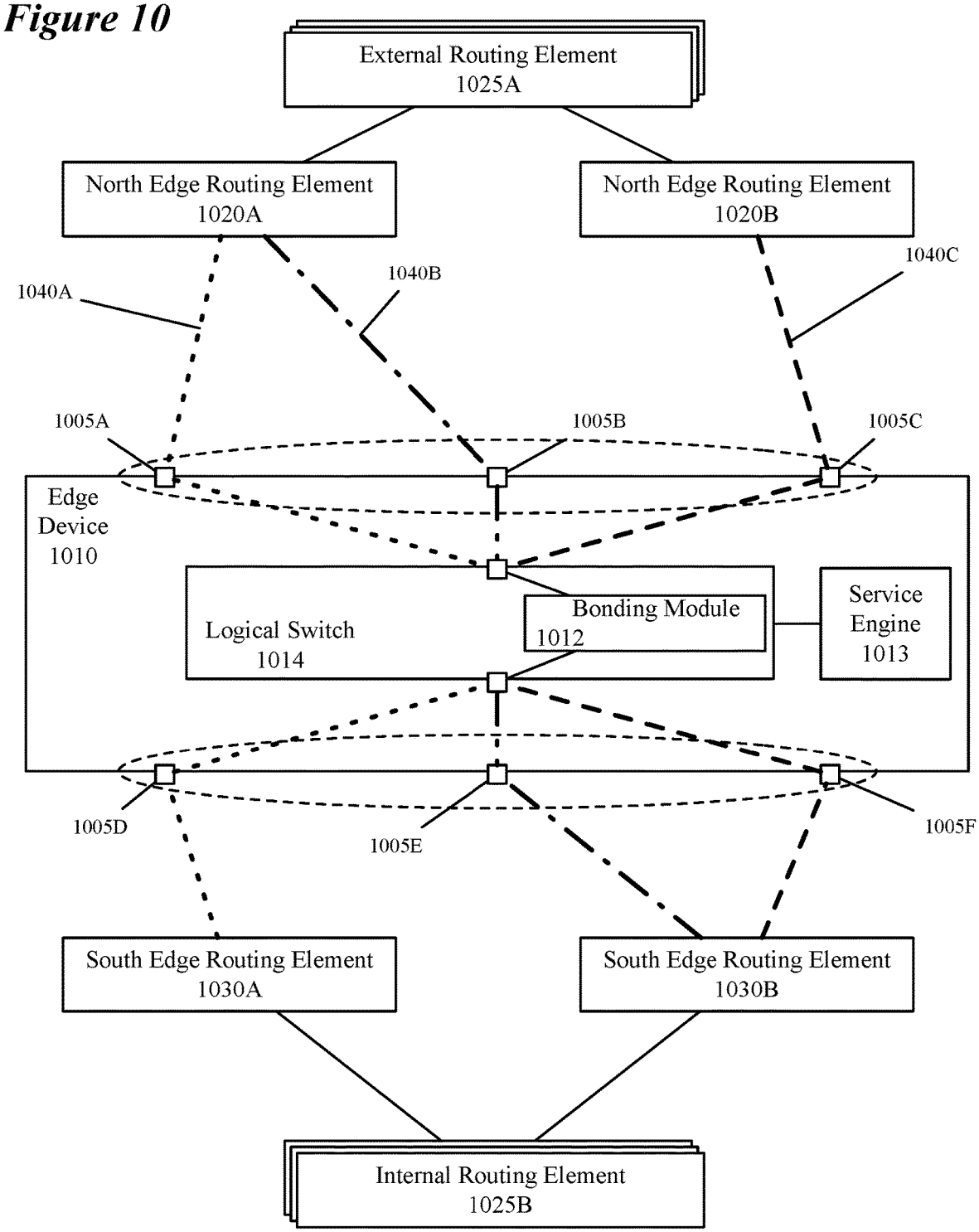
FIG. 10 illustrates a second embodiment of a network in which the invention is carried out.

FIG. 10 illustrates a second embodiment of a network in which the invention is carried out. FIG. 10 illustrates a particular network edge device 1010 connecting a first set of north edge routing elements 1020 connected to interfaces 1005A-C and a second set of south edge routing elements 1030 connected to interfaces 1005D-F. The sets of routing elements 1020 and 1030 help to connect other routing elements 1025 in the networks on either side of the network edge device 1010. The paths between routing (e.g., forwarding) elements in the sets of routing elements 1020 and 1030 (i.e., 1005A to 1005D and 1005B to 1005E and 1005C to 1005F) are equal cost in the illustrated embodiment and any of them can be selected for transmitting data messages between the routing elements 1025. The network edge device 1010 includes bonding module 1012 that supports the bonded interfaces on the north and south sides of the network edge device 1010, respectively. In some embodiments, the bonding module is a function of the logical switch that implements the interface bonding and stores the mapping tables or otherwise maintains the connections between specific interfaces. The bonding module 1012 supports different interfaces of a single logical switch 1014 that (1) provides a bridge between the north and south networks and (2) provides a stateful service for data messages crossing the bridge using service engine 1013. The bridge in FIG. 10 is depicted as one logical switch 1014, however, in some other embodiments, the bridge is implemented using multiple logical switches as in FIG. 9.

The logical switch 1014 provides a stateful service to data messages passing through the logical switch 1014 between the two networks. The stateful service, in some embodiments is provided by the service engine 1013 that provides a firewall service, network address translation, virtual private network, etc. that may require processing all the data messages in a data message flow for proper performance. Additional services, in some embodiments, are provided by additional service engines (not shown for clarity). By bonding the two equal cost paths, the invention ensures that all data messages that are sent along either path are processed by the same service engine 1013 to ensure that state information maintained at the service engine is complete. As path 1040A connects interfaces 1005A and 1005D, path 1040B connects interfaces 1005B and 1005E, and path 1040C connects interfaces 1005C and 1005F, the bonding modules store a mapping table that ensures that traffic received at any particular interface are forwarded to the destination using the corresponding interface. One of ordinary skill in the art would appreciate that in some embodiments there are many more than three equal cost paths and that three paths are shown for clarity in FIG. 10.

The network edge device, in some embodiments, is a primary network edge device and a secondary network edge device is implemented as a standby network edge device. The secondary network edge device replicates the interfaces and associations of the primary network edge device and is available to assume the functions of the primary network edge device in the case of a failure of the primary network edge device. In some embodiments, failure of the primary network edge device is defined by a user. The definition of failure, in some embodiments, is defined by a user-supplied policy (e.g., a threshold for a given metric). In other embodiments, failover occurs when all paths through the primary network edge device fail.

Figure 11:
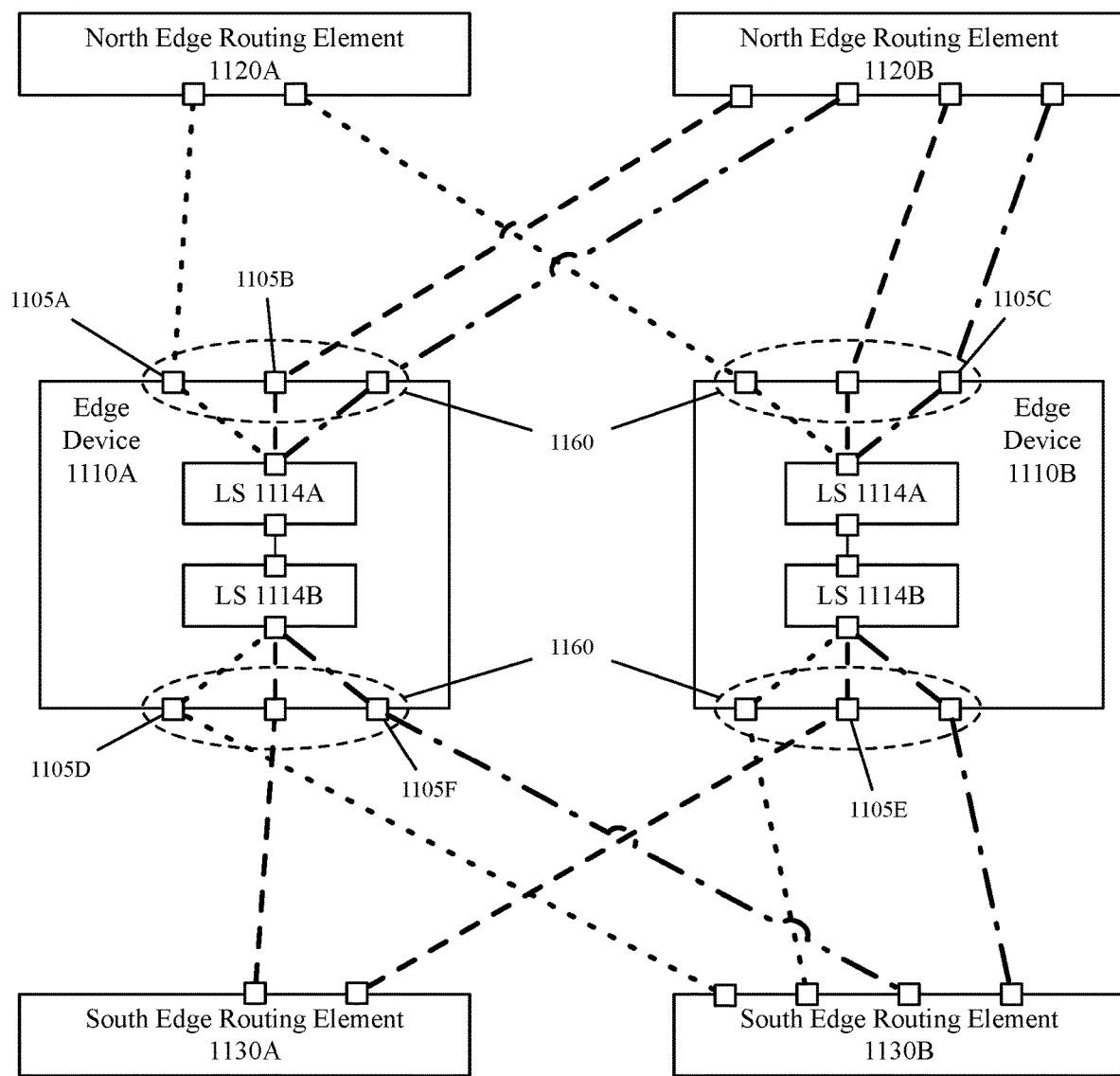
FIG. 11 illustrates an embodiment including active and standby network edge devices.

FIG. 11 illustrates an embodiment including active and standby network edge devices 1110A and 1110B. FIG. 11 illustrates pairs of edge routing (forwarding) elements 1120 and 1130 connected by three paths through each of an active network edge device 1110A and a standby network edge device 1110B. The bonding is indicated by 1160 which, in some embodiments, represents a standard bonding operation by each logical switch 1114 for the logical interfaces associated with the bonded interfaces of edge devices 1110. Similar to FIG. 9, the network edge devices 1110 provide a set of bonded interfaces 1105A-C (on the north side) and 1105D-F (on the south side) and a set of logical switches 1114 that connect the pairs of edge routing (forwarding) elements 1120 and 1130. A service engine that provides stateful services is omitted from the illustrated embodiment for clarity but is understood to be present as in FIGS. 9 and 10. As in FIGS. 9 and 10, the interfaces of the network edge devices 1110 are deterministically paired such that data messages entering interface 1105A exits from 1105D (bonding modules supporting the deterministic mapping are not shown).

The standby edge device 1110B, in some embodiments, has an equivalent set of interfaces (1105A-C on the north side and 1105D-F on the south side) and advertises the cost of the path through the interfaces of the standby edge device 1110B as having a higher cost than the paths through the equivalent interfaces of the active edge device 1110A such that all data messages destined for the pair of edge routers 1130 passes through active edge device 1110A. An active-standby configuration is often used when stateful services are provided at the edge device. The failover process of similar embodiments employing active and standby network edge devices is described in FIG. 12.

Because the edge device is transparent to the routing elements, in some embodiments, when a particular connection to the edge device fails (e.g., a connection between the north edge routing element 1120B and interface 1105B on edge device 1110A) the edge device 1110 is responsible for bringing down a corresponding connection on the other side of the edge device 1110 (e.g., the connection between the south edge routing element 1130A and interface 1105E on edge device 1110A). In the case of a failure of either interface 1105B or 1105E, traffic from within the network on the north side can still reach destinations in the network on the south side and vice versa using edge routing element 1130B. Accordingly, as will be described in relation to FIG. 12 the standby edge device 1110B does not necessarily need to become the active edge device.

Figure 12:
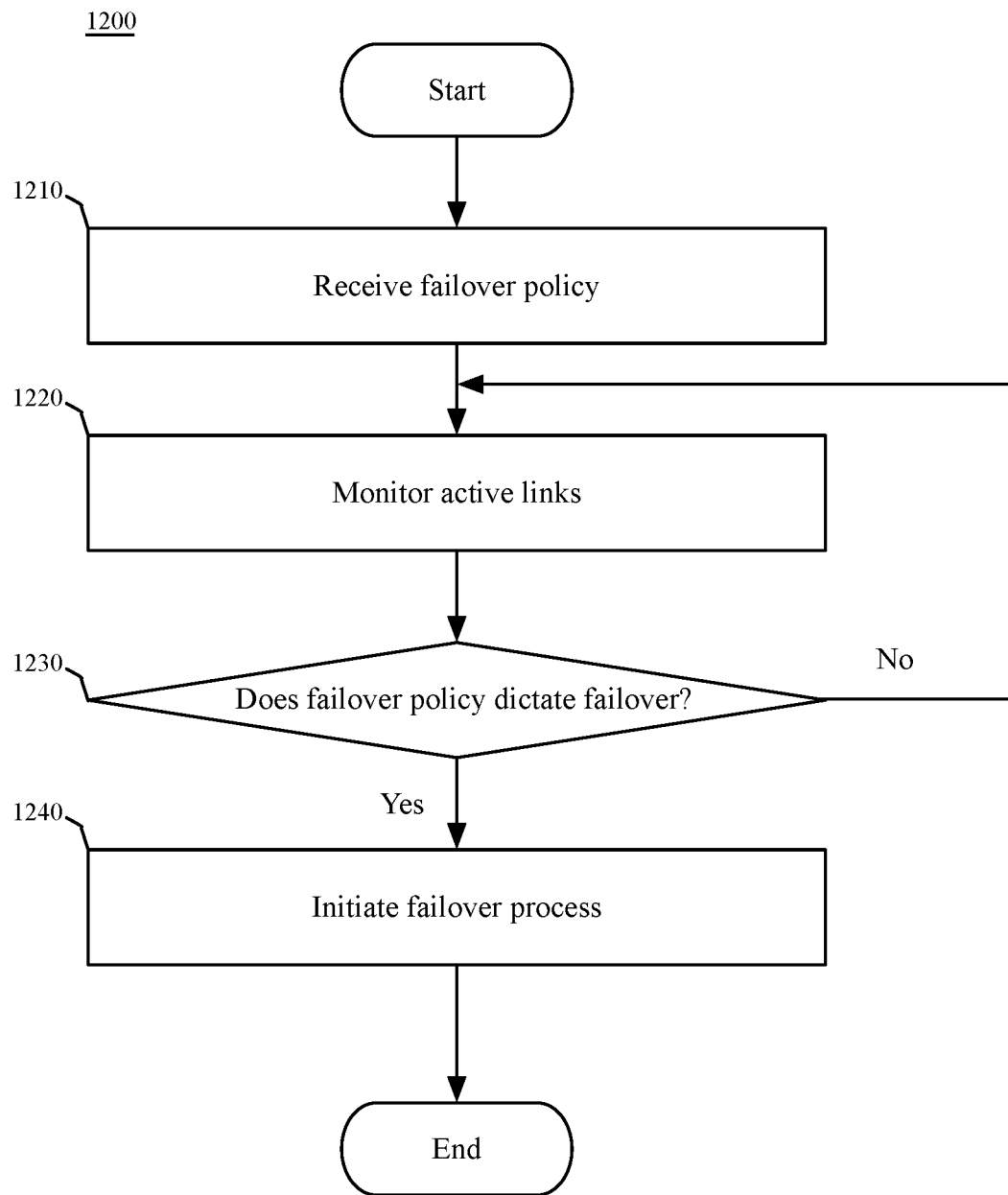
FIG. 12 conceptually illustrates a process for failure handling.

FIG. 12 conceptually illustrates a process 1200 for failure handling (i.e., failover). The process 1200 is performed by a network edge device, or network manager computer that monitors the health of an active network edge device (e.g., network edge device 1110A). The process 1200 begins by receiving (at 1210) a failover policy that defines how different failures are to be handled. In some embodiments, the failover policy is received from a user and specifies threshold values for a set of connection (link) metrics (e.g., dropped data messages, bandwidth, a current load metric, a reliability metric, and a capacity metric) that trigger the standby network edge device to become the active network edge device. The change in active network edge devices, in some embodiments, applies only to new data message flows with existing data message flows directed to the previously active network edge device. In other embodiments, all data message flows are directed to the new active network edge device upon failover.

In some embodiments, link failure is determined at the level of the logical switch (or switches) implemented by the network edge device (e.g., at the level of a logical switch port or interface). In previous embodiments using different sets of logical switches for each set of associated (paired) interfaces (i.e., not using bonding with deterministic forwarding), failure detection required separate monitoring and failover which introduced additional complexity. In the illustrated embodiment, monitoring a single logical switch failure is simpler and does not require failover until all paths have failed. Additionally, as described above, a user can set a policy for failover other than complete failure by setting up conditional failover based on connection metrics of the combined multiple links between the networks. The network topology is therefore maintained for longer periods than would be the case if a single link failure out of multiple links could trigger a failover event.

The process 1200 then proceeds to monitor (at 1220) the link (representing the combined links over all the bonded interfaces). In some embodiments, the link monitoring includes monitoring the metrics specified in a default or user-specified policy. Monitoring, in some embodiments, is performed by a network manager computer that initiates a failover process when the conditions for failover are met. In some embodiments, monitoring is performed by the standby network edge device to determine if it needs to initiate a failover process and become the new active network edge device.

The process 1200 determines (at 1230) whether a failover process has been triggered based on the monitored metrics and the received failover policy. If the policy has not been met, i.e., the metrics have not crossed the specified threshold from an acceptable to an unacceptable value, the process returns to monitor (at 1220) the link. In some embodiments, the policy specifies a plurality of thresholds such that a first threshold may be crossed for a specified period before triggering a failover process, while a second threshold is specified such that any crossing of the second threshold triggers a failover process.

If the process 1200 determines (at 1230) that the failover policy triggers a failover based on the monitored metrics, the process initiates (at 1240) a failover process. In some embodiments a failover process causes a formerly-standby network edge device to advertise its availability with a lower cost and a formerly-active network edge device to advertise its availability with a higher cost such that all traffic is now directed to new active (formerly-standby) device. One of ordinary skill in the art will appreciate that there are additional ways of handling failover that are not described here.

Figure 13:
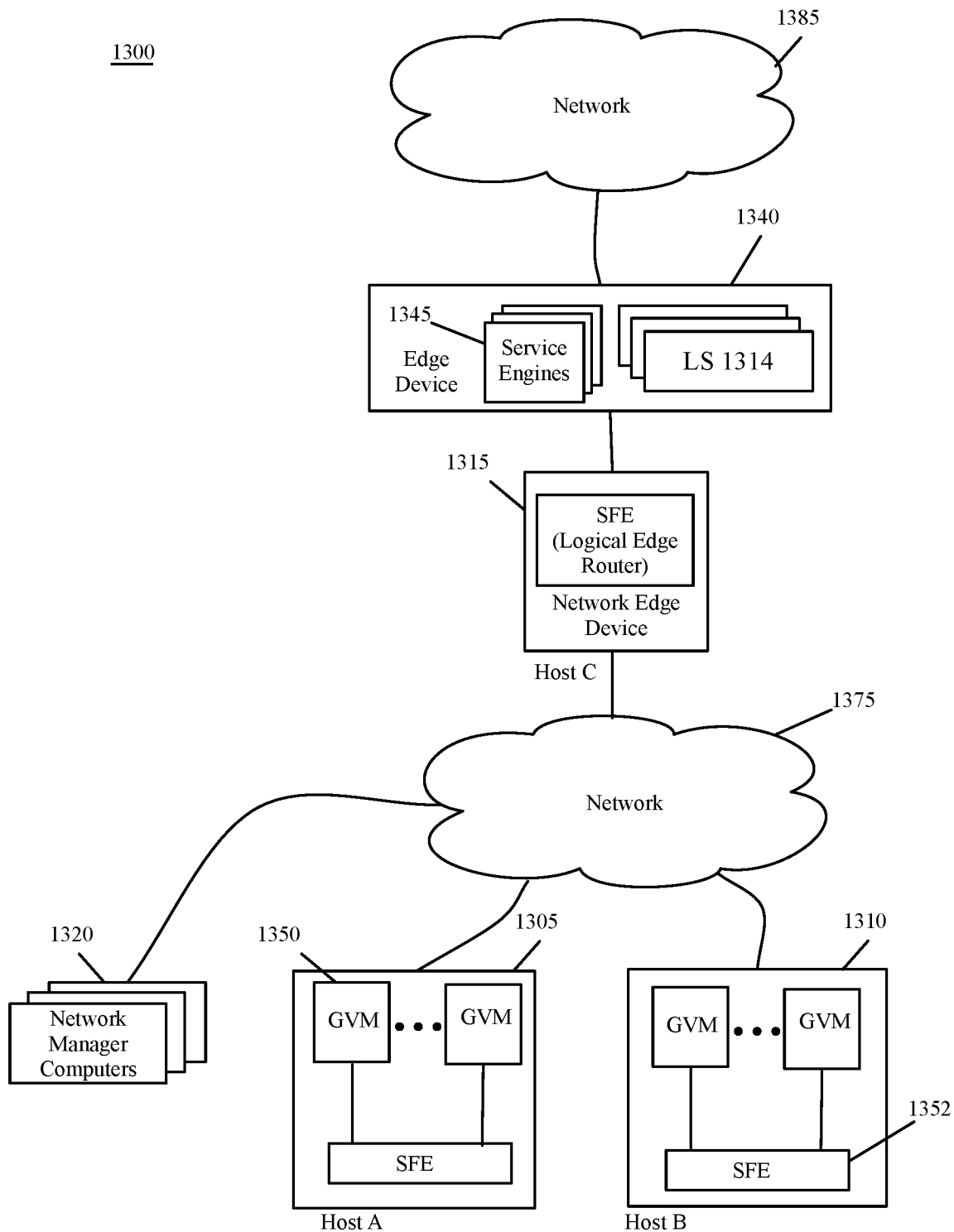
FIG. 13 illustrates the system of some embodiments.

FIG. 13 illustrates the system 1300 of some embodiments. As shown, this system includes multiple virtualized hosts 1305 and 1310 (hosting guest virtual machines 1350 and software forwarding elements (SFEs) 1352), a set of network manager computers 1320, and a network edge device 1315. The virtualized hosts 1305 and 1310 host compute nodes that can be sources and destinations of data messages sent through network 1375 and network edge device 1315 to or from a compute node in network 1385. The network edge device 1315 is shown executing a software forwarding element (SFE) implementing a logical edge router for the managed network including hosts 1305-1315 connected by network 1375. The edge device 1340 executes a set of logical switches 1314 and a set of service engines (e.g., service engine instances) 1345 as described above. As shown in FIG. 13, the hosts 1305 and 1310, the controller set 1320, and the network edge device 1315 communicatively couple through a network 1375, which can include a local area network (LAN), a wide area network (WAN) or a network of networks (e.g., Internet). Network 1385, in some embodiments, is one of a second managed network in a same datacenter, a managed network in a second datacenter, and an external network.

The set of network manager computers 1320 provide control and management functionality for defining and managing the instantiation of one or more GVMs on each host (for the purposes of this discussion, network controllers 1320 includes both management plane and control plane controllers). These controllers are also responsible, in some embodiments, for configuring the edge device to provide the functionality described above. These controllers, in some embodiments, also provide control and management functionality for defining and managing multiple logical networks that are defined on the common software forwarding elements of the hosts.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 14 conceptually illustrates a computer system 1400 with which some embodiments of the invention are implemented. The computer system 1400 can be used to implement any of the above-described hosts, controllers, and managers. As such, it can be used to execute any of the above described processes. This computer system includes various types of non-transitory machine readable media and interfaces for various other types of machine readable media. Computer system 1400 includes a bus 1405, processing unit(s) 1410, a system memory 1425, a read-only memory 1430, a permanent storage device 1435, input devices 1440, and output devices 1445.

The bus 1405 collectively represents all system, peripheral, and chipset buses that communicatively connect the numerous internal devices of the computer system 1400. For instance, the bus 1405 communicatively connects the processing unit(s) 1410 with the read-only memory 1430, the system memory 1425, and the permanent storage device 1435.

From these various memory units, the processing unit(s) 1410 retrieve instructions to execute and data to process in order to execute the processes of the invention. The processing unit(s) may be a single processor or a multi-core processor in different embodiments. The read-only-memory (ROM) 1430 stores static data and instructions that are needed by the processing unit(s) 1410 and other modules of the computer system. The permanent storage device 1435, on the other hand, is a read-and-write memory device. This device is a non-volatile memory unit that stores instructions and data even when the computer system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, etc.) as the permanent storage device. Like the permanent storage device 1435, the system memory 1425 is a read-and-write memory device. However, unlike storage device 1435, the system memory is a volatile read-and-write memory, such a random access memory. The system memory stores some of the instructions and data that the processor needs at runtime. In some embodiments, the invention's processes are stored in the system memory 1425, the permanent storage device 1435, and/or the read-only memory 1430. From these various memory units, the processing unit(s) 1410 retrieve instructions to execute and data to process in order to execute the processes of some embodiments.

The bus 1405 also connects to the input and output devices 1440 and 1445. The input devices enable the user to communicate information and select commands to the computer system. The input devices 1440 include alphanumeric keyboards and pointing devices (also called "cursor control devices"). The output devices 1445 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 14, bus 1405 also couples computer system 1400 to a network 1465 through a network adapter (not shown). In this manner, the computer can be a part of a network of computers (such as a local area network ("LAN"), a wide area network ("WAN"), or an Intranet, or a network of networks, such as the Internet. Any or all components of computer system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for providing, at a network edge device, a stateful service for data messages sent from a first set of gateway devices of a first network to a second set of gateway devices of a second network, the method comprising:
    associating a first plurality of interfaces of the network edge device connected to interfaces of the first set of gateway devices with a first interface of a first logical switch implemented by the network edge device;
    associating a second plurality of interfaces of the network edge device connected to interfaces of the second set of gateway devices with a second interface of a second logical switch implemented by the network edge device, wherein each interface in the first plurality of interfaces is mapped to one corresponding interface in the second plurality of interfaces;
    providing the stateful service to a data message received at a particular interface as part of the logical processing of the received data message through the first and second logical switches; and
    forwarding the data message towards its destination using an egress interface identified as corresponding to the particular interface by the mapping.

2. The method of claim 1, wherein the stateful service is a stateful firewall service.

3. The method of claim 1, wherein the first and second networks are each one of a logical network and a physical network.

4. The method of claim 1, wherein:
    each set of mapped corresponding interfaces comprises a different path between the set of gateway devices in the first network and the set of gateway devices in the second network; and
    for different data messages, different paths are selected by an equal cost multi-pathing (ECMP) operation performed by (1) gateway devices in the first network and (2) gateway devices in the second network.

5. The method of claim 1, wherein the network edge device is one of (1) a hardware device placed between the first and second set of gateway devices and (2) a software device executing on a gateway device in the first set of gateway devices.

6. The method of claim 1, wherein the first and second logical switches are different logical switches connected at ports of the first and second logical switches that are different that the ports associated with the first and second plurality of interfaces.

7. The method of claim 6, wherein the stateful service is provided at the ports connecting the first and second logical switch.

8. The method of claim 1, wherein the second logical switch is the first logical switch and the port of the first logical switch associated with the first plurality of interfaces is a different port of the first logical switch than the port of the first logical switch port associated with the second plurality of interfaces.

9. The method of claim 1, wherein the associations of the first and second pluralities with the ports of the first and second logical switches are bonds, and first and second bonding modules associated with the first and second logical switches, respectively, store copies of the mapping used to determine egress interfaces for data messages based on ingress interfaces associated with the data messages.

10. The method of claim 9, wherein a particular bonding module associated with an ingress interface associates an identifier of the ingress interface with a particular data message, the identifier used by the other bonding module associated with an egress interface of the data message to determine the egress interface based on the mapping.

11. The method of claim 10, wherein the bonding module associates the identifier of the ingress interface with the particular data message by storing the identifier in metadata of the particular data message.

12. The method of claim 10, wherein the association of the identifier of the ingress interface with the data message is removed prior to the data message being provided to an egress port of the network edge device.

13. The method of claim 12, wherein the mapping is stored in a mapping table that stores sets of corresponding ingress and egress interfaces.

14. The method of claim 1, wherein the network edge device is a first, active network edge device and a second, standby network edge device for providing the stateful service is configured with the same pluralities of interfaces, associations, and mapping.

15. The method of claim 14, wherein
    the active network edge device remains active until all paths between the first network and the second network that pass through the active network edge device fail; and
    when all the paths between the first network and the second network that pass through the active network edge device fail, the second network edge device becomes the active network edge device and the first network edge device becomes the standby network edge device.

16. The method of claim 14, wherein:
    the active network edge device remains active until a connection metric falls below a threshold value; and
    when the connection metric falls below the threshold value, the second network edge device becomes the active network edge device and the first network edge device becomes the standby network edge device.

17. The method of claim 16, wherein the threshold value is set by a user.

18. The method of claim 16, wherein the connection metric is at least one of a bandwidth, a current load metric, a reliability metric, and a capacity metric.

19. The method of claim 1, wherein the set of gateway devices of the first network and the set of gateways devices of the second network comprise different numbers of gateway devices.

20. The method of claim 1, wherein the mapping table stores different associations of each interface in the first plurality of interfaces and one interface in the second plurality of interfaces for each of a plurality of different flows.

* * * * *